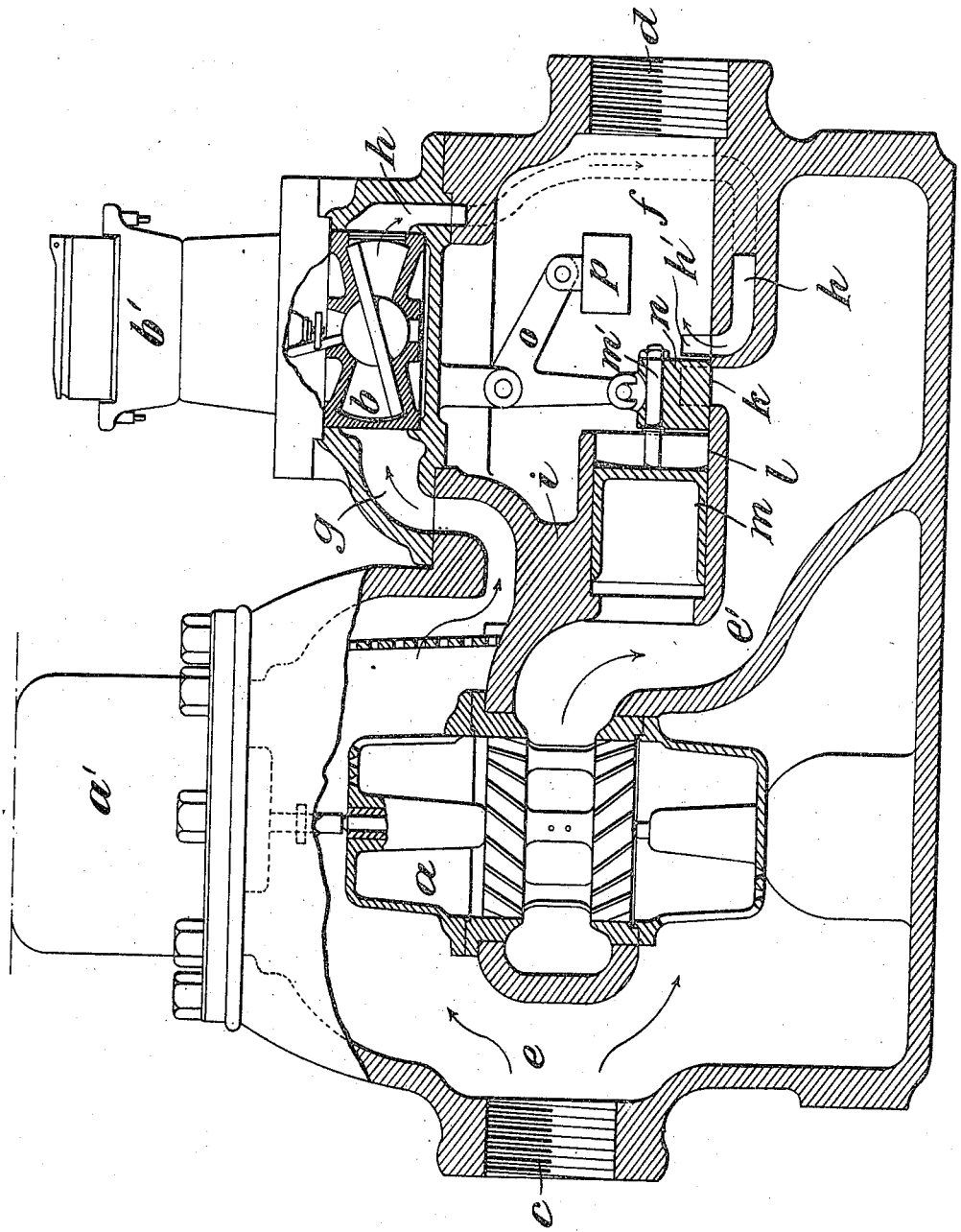

UNITED STATES PATENT OFFICE.

HENRY I. DILTS, OF NEW YORK, N. Y., ASSIGNOR TO NEPTUNE METER COMPANY, OF NEW YORK, N. Y., A CORPORATION OF NEW JERSEY.

WATER-METER.

966,318. Specification of Letters Patent. Patented Aug. 2, 1910.

Application filed March 18, 1910. Serial No. 550,257.

*To all whom it may concern:*

Be it known that I, HENRY I. DILTS, a citizen of the United States, residing in Long Island City, in the borough of Queens of the city of New York, in the State of New York, have invented certain new and useful Improvements in Water-Meters, of which the following is a specification, reference being had to the accompanying drawing, forming a part hereof.

This invention relates to compound water meters in which a high-duty metering device and a low-duty metering device are combined, a valve, operated by variations in the pressure differential, acting to permit the flow through one of such meters, and to prevent the flow through the other of such meters, and it is particularly concerned with the construction of the valve by which the flow through one meter or the other is determined. In accordance with this invention the valve which controls the passage of the liquid through one metering device or the other is connected with a piston which is subject on the one side to the inflow pressure and on the other side to the outflow pressure.

The invention will be more fully explained hereinafter with reference to the accompanying drawing which presents a view, partly in elevation and partly in vertical section, of a compound meter which embodies the invention.

As in the structure represented in the drawing, the relatively high-duty metering device *a* and the relatively low-duty metering device *b*, are preferably, although not necessarily, combined in a single structure. These metering devices, moreover, may be of any suitable character, the metering device *a* being shown as of the turbine type, which is well adapted to register accurately large flows of liquid, while the metering device *b* is of the nutating disk type, which is well adapted to register accurately small flows of liquid. The metering devices are respectively provided, as usual, with registering mechanisms, as at *a′* and *b′*. In the structure shown, there is a common inlet or inflow opening for the liquid at *c* and a common outlet or outflow at *d*. The liquid which enters at the inlet *c* passes into a chamber *e* from which, according to the position of the valve hereinafter referred to, it flows either through that branch of the common conduit which includes the high-duty metering device *a* and the channel *e′*, into the chamber *f*, whence it escapes through the outlet *d*, or through that branch which includes the channel *g*, the low duty metering device *b* and the channel *h*, into the chamber *f*.

Between the channel *e′* and the chamber *f* is a diaphragm or wall *i*, in which is formed a port *k* through which communication may be established between the branch *e′* and the outlet chamber *f*. The liquid which flows through the other branch, which includes the low-duty meter, is conducted through the channel *h*, which may be formed in the wall of the chamber *f* and terminates in a port *h′* adjacent to the port *k*. In the wall *i* is formed a cylindrical chamber *l* which communicates at one end with the high-duty branch *e′* and at the other end with the outflow chamber *f*, and in the chamber *l* is disposed a piston *m* which is subject on one side to the pressure in the branch *e′*, which is the inflow pressure, and on the other side, to the pressure in the chamber *f*, which is the outflow pressure, and is therefore subject to variations in the pressure differential. To the piston rod *m* is secured by means of piston rod *m′* a valve body *n* which is adapted, in one position of the piston *m*, to cover and close the port *k*, and therefore to prevent flow of liquid through the metering device *a*, while leaving the port *h′* uncovered and therefore permitting flow through the metering device *b*, and is adapted in another position of the piston *m*, to cover and close the port *h′* and to uncover the port *k*, thereby permitting flow through the metering device *a* and preventing flow through the metering device *b*. The chamber *l* is preferably arranged with its axis horizontal and in order that the piston may be held against the normal low pressure, so as to prevent flow under that condition through the high-duty meter, a bell crank lever *o* is mounted in the chamber *f*, one arm being connected to the piston through the valve body *n* and the piston rod *m′* and the other or substantially horizontal arm having secured thereto a suitable weight *p*. Any substantial increase in the pressure differential, such as would be created by a large flow, moves the piston *m* against the action of the weight *p* and moves the valve body *n* so as to open the port *k* and close the port *h′*. Otherwise the weight *p* holds the piston m in the position represented in the drawing in which the valve body n closes the port k and opens the port h', permitting flow through the low-duty meter alone.

I claim as my invention:

The combination of a relatively high-duty meter, a relatively low-duty meter, a common conduit having branches in which the two meters are respectively located, the inflow and the outflow being common to both branches, a wall between the high-duty branch and the common outflow chamber having a port communicating with the high-duty branch and a port communicating with the low-duty branch, the wall having a cylindrical chamber formed therein, opening at one end into the high-duty branch and at the other end into the common outflow chamber, a piston in said cylindrical chamber, subject on one side to the pressure in the high-duty branch and on the other side to the pressure in the outflow chamber, a valve body means whereby the valve body is connected to said piston, and located in the outflow chamber and adapted to cover one or the other of said ports according to the position of the piston, a weighted bell crank lever, and means whereby the lever is operatively connected to the piston to hold it normally against low pressure in the high-duty branch.

This specification signed and witnessed this 11th day of March, A. D. 1910.

HENRY I. DILTS.

Signed in the presence of—
ELLA J. KRUGER,
AMBROSE L. O'SHEA.